(12) United States Patent
Laird

(10) Patent No.: US 7,005,190 B2
(45) Date of Patent: Feb. 28, 2006

(54) HEAT TREATABLE COATED ARTICLE WITH REDUCED COLOR SHIFT AT HIGH VIEWING ANGLES

(75) Inventor: Ronald E. Laird, Dexter, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 74 days.

(21) Appl. No.: 10/324,093

(22) Filed: Dec. 20, 2002

(65) Prior Publication Data
US 2004/0121163 A1    Jun. 24, 2004

(51) Int. Cl.
*B32B 9/00*    (2006.01)

(52) U.S. Cl. ............ 428/432; 428/448; 428/699; 428/701; 428/702

(58) Field of Classification Search ......... 428/432, 428/446, 448, 699, 701, 702
See application file for complete search history.

(56) References Cited

U.S. PATENT DOCUMENTS

| | | |
|---|---|---|
| 3,682,528 A | 8/1972 | Apfel et al. |
| 4,166,876 A | 9/1979 | Chiba et al. |
| 4,293,593 A | 10/1981 | Yoldas |
| 4,413,877 A | 11/1983 | Suzuki et al. |
| 4,744,880 A | 5/1988 | Gillery et al. |
| 4,782,216 A | 11/1988 | Woodard |
| 4,786,783 A | 11/1988 | Woodard |
| 4,799,745 A | 1/1989 | Meyer et al. |
| 4,806,220 A | 2/1989 | Finley |
| 4,898,789 A | 2/1990 | Finley |
| 4,898,790 A | 2/1990 | Finley |
| 5,011,745 A | 4/1991 | Dietrich et al. |
| 5,028,759 A | 7/1991 | Finley |
| 5,059,295 A | 10/1991 | Finley |
| 5,201,926 A | 4/1993 | Szczyrbowski et al. |
| 5,229,194 A | 7/1993 | Lingle et al. |
| 5,242,560 A | 9/1993 | Lingle et al. |
| 5,262,032 A | 11/1993 | Hartig et al. |
| 5,270,517 A | 12/1993 | Finley |
| 5,298,048 A | 3/1994 | Lingle et al. |
| 5,302,449 A | 4/1994 | Eby et al. |
| 5,332,888 A | 7/1994 | Tausch et al. |
| 5,342,675 A | 8/1994 | Kobayashi et al. |
| 5,364,518 A | 11/1994 | Hartig et al. |
| 5,377,045 A | 12/1994 | Wolfe et al. |
| 5,425,861 A | 6/1995 | Hartig et al. |
| 5,514,476 A | 5/1996 | Hartig et al. |
| 5,521,765 A | 5/1996 | Wolfe |

(Continued)

FOREIGN PATENT DOCUMENTS

DE        1 621 347        6/1971

(Continued)

OTHER PUBLICATIONS

Technical Digest 1995, "Optical Interference Coatings", Wolfe et al., vol. 17, pps. 115-117.

(Continued)

*Primary Examiner*—Deborah Jones
*Assistant Examiner*—G. Blackwell
(74) *Attorney, Agent, or Firm*—Nixon & Vanderhye P.C.

(57) ABSTRACT

A coated article is provided so as to have fairly neutral a* and/or b* color values at high viewing angles such as 45 and/or 60 degrees off-axis. In certain example embodiments, the neutral a* and/or b* values at high viewing angles (VA) are caused by lessening the thickness of a bottom titanium oxide layer. Coated articles herein may be used in the context of insulating glass (IG) window units, or in other suitable applications.

16 Claims, 3 Drawing Sheets

U.S. PATENT DOCUMENTS

| | | |
|---|---|---|
| 5,552,180 A | 9/1996 | Finley et al. |
| 5,557,462 A | 9/1996 | Hartig et al. |
| 5,563,734 A | 10/1996 | Wolfe et al. |
| 5,584,902 A | 12/1996 | Hartig et al. |
| 5,688,585 A | 11/1997 | Lingle et al. |
| 5,770,321 A | 6/1998 | Hartig et al. |
| 5,800,933 A | 9/1998 | Hartig et al. |
| 5,811,191 A | 9/1998 | Neuman |
| 5,821,001 A | 10/1998 | Arbab et al. |
| 5,834,103 A | 11/1998 | Bond et al. |
| 5,897,372 A | 4/1999 | Howard |
| 5,902,505 A | 5/1999 | Finley |
| 5,935,702 A | 8/1999 | Macquart et al. |
| 5,942,338 A | 8/1999 | Arbab et al. |
| 5,962,115 A | 10/1999 | Zmelty et al. |
| 5,965,246 A | 10/1999 | Guiselin et al. |
| 6,014,872 A | 1/2000 | Hartig et al. |
| 6,045,896 A | 4/2000 | Boire et al. |
| 6,059,909 A | 5/2000 | Hartig et al. |
| 6,060,178 A | 5/2000 | Krisko |
| 6,086,210 A | 7/2000 | Krisko et al. |
| 6,114,043 A | 9/2000 | Joret |
| 6,132,881 A | 10/2000 | Hartig et al. |
| 6,142,642 A | 11/2000 | Krisko et al. |
| 6,159,607 A | 12/2000 | Hartig et al. |
| 6,190,776 B1 | 2/2001 | Demiryont |
| 6,231,999 B1 | 5/2001 | Krisko |
| 6,261,693 B1 | 7/2001 | Veerasamy |
| 6,277,480 B1 | 8/2001 | Veerasamy et al. |
| 6,287,675 B1 | 9/2001 | Guiselin et al. |
| 6,292,302 B1 | 9/2001 | Krisko et al. |
| 6,306,525 B1 | 10/2001 | Schicht et al. |
| 6,316,111 B1 | 11/2001 | Krisko |
| 6,322,881 B1 | 11/2001 | Boire et al. |
| 6,354,109 B1 | 3/2002 | Boire et al. |
| 6,355,334 B1 | 3/2002 | Rondeau et al. |
| 6,398,925 B1 | 6/2002 | Arbab et al. |
| 6,445,503 B1 | 9/2002 | Lingle |
| 6,524,688 B1 | 2/2003 | Eby et al. |
| 6,558,800 B1 | 5/2003 | Stachowiak |
| 6,572,940 B1 | 6/2003 | Noethe et al. |
| 6,576,349 B1 | 6/2003 | Lingle et al. |
| 6,730,352 B1 | 5/2004 | Stachowiak |
| 6,787,005 B1 | 9/2004 | Laird et al. |
| 6,800,179 B1 | 10/2004 | Wang |
| 6,802,943 B1 | 10/2004 | Stachowiak |
| 6,830,817 B1 | 12/2004 | Stachowiak |
| 2001/0041252 A1 | 11/2001 | Laird |
| 2002/0031674 A1 | 3/2002 | Laird |
| 2002/0064662 A1 | 5/2002 | Lingle et al. |
| 2002/0136905 A1 | 9/2002 | Medwick et al. |
| 2002/0192473 A1 | 12/2002 | Gentilhomme et al. |
| 2003/0049464 A1 | 3/2003 | Glenn et al. |
| 2004/0005467 A1 | 1/2004 | Neuman et al. |

FOREIGN PATENT DOCUMENTS

| | | |
|---|---|---|
| DE | 42 11 363 | 6/1971 |
| EP | 0 721 112 | 7/1996 |
| EP | 0 857 700 A1 | 8/1998 |
| EP | 0 963 960 A1 | 12/1999 |
| EP | 0 999 192 A1 | 5/2000 |
| EP | 1 174 397 A2 * | 1/2002 |
| WO | WO 98/58885 | 12/1998 |
| WO | WO 01/21540 | 3/2001 |
| WO | WO 02/04375 | 1/2002 |

OTHER PUBLICATIONS

U.S. Appl. No. 09/794,224, filed Feb. 28, 2001 (copy attached).

U.S. Appl. No. 09/978,184, filed Oct. 17, 2001 (copy attached).

"Heat Insulating Glass Which Can Be Thermally Worked", Hironobu, 05124839, Oct. 1991.

* cited by examiner

HEAT TREATABLE COATED ARTICLE WITH REDUCED COLOR SHIFT AT HIGH VIEWING ANGLES

CROSS-REFERENCES TO RELATED APPLICATIONS

This application is related to U.S. patent application Ser. No. 09/794,224, filed Feb. 28, 2001, and also to U.S. patent application Ser. No. 09/978,184, filed Oct. 17, 2001, both of which are hereby incorporated herein by reference.

BACKGROUND OF THE INVENTION

Windows including glass substrates with solar control coatings provided thereon are known in the art. Such windows may be used in the context of architectural windows, automotive windows, and/or the like.

Commercial architectural applications often require that certain windows in a building be heat treated (HT) (e.g., thermally tempered) while others need not be. Given that some buildings require the use of both heat treated (HT) and non-HT windows, it will be appreciated by those skilled in the art that there sometimes exists a need in the art to approximately color match HT and non-HT windows in the same building. Color matching is often thought of in terms of a normal viewing angle (i.e., directly on-axis or 0 degree viewing angle looking straight at the window).

However, color at high viewing angles may also be important in certain applications. For example, significant coloration (e.g., very red or very yellow) at high viewing angles (e.g., 45 and/or 60 degrees off-axis) are often undesirable.

WO 02/04375 (corresponding to U.S. Ser. No. 09/794, 224, hereby incorporated herein by reference) discloses a heat treated (HT) low-E coating including a pair of silver layers and numerous dielectric layers. The Examples 1–3 in WO 02/04375 are primarily designed for automotive uses such as vehicle windshields. Accordingly, the Examples of WO 02/04375 utilize silvers layers that are about 105 Å thick in an effort to achieve high visible transmission. This desire for very high visible transmission and automotive characteristics results in a rather high TS % (Total Solar energy transmittance) of about 46.75% (see Table 8 on page 38) and a rather high SHGC (Solar Heat Gain Coefficient) well above 0.4.

However, in architectural applications (e.g., for use in IG window units), TS % and SHGC are more important and are generally desired to be lower than the values realized by the Examples in WO 02/04375. Thus, when the coating of WO 02/04375 was tailored for architectural applications, the result was a thicker upper silver layer (130 Å) in order to lower the TS % and SHGC to desirable ranges. A resulting commercially sold HT architectural coating in this regard is set forth below (this was used in IG units), with the layers listed in order form the glass substrate outwardly.

Conventional HT Coated Article

| Layer | Thickness |
| --- | --- |
| Glass Substrate | 1–10 mm |
| $TiO_2$ | 75 Å |
| $Si_3N_4$ | 165 Å |
| $NiCrO_x$ | 26 Å |
| Ag | 98 Å |
| $NiCrO_x$ | 26 Å |
| $SnO_2$ | 525 Å |
| $Si_3N_4$ | 165 Å |
| $NiCrO_x$ | 26 Å |
| Ag | 130 Å |
| $NiCrO_x$ | 26 Å |
| $SnO_2$ | 100 Å |
| $Si_3N_4$ | 210 Å |

The aforesaid conventional HT coated article, has the following color characteristics at both a normal viewing angle (i.e., straight-on 0 degree viewing angle) and higher viewing angles (VA) such as 45 degrees and 60 degrees off-axis (measured monolithically).

TABLE 1

Color Shift Characteristics of Article from Above

| Color Characteristic | 0 deg. VA | 45 deg. VA | 60 deg. VA |
| --- | --- | --- | --- |
| Glass Side Reflective | | | |
| a* | −0.31 | 0.11 | −0.35 |
| b* | −0.73 | 3.46 | 4.66 |
| L* | 26.97 | 31.65 | 45.29 |
| $\Delta b^*_g$ | n/a | 4.19 | 5.39 |
| Film Side Reflective | | | |
| a* | −1.35 | 0.98 | 0.79 |
| b* | 3.44 | 6.51 | 6.16 |
| L* | 25.57 | 30.94 | 45.61 |

It can be seen from the above that while the glass side a* color value is fairly stable and neutral upon viewing angle (VA) change from 0 to 60 degrees, the glass side b* color value realizes significant change/shift upon viewing angle change from 0 to 45 and/or 60 degrees (i.e., $\Delta b^*$ is high). More importantly, the b* value moves drastically toward and into a high positive b* region (e.g., b*=4.66 at the 60 degree viewing angle). These high b* values at the high viewing angles of 45 and 60 degrees are undesirable since they cause the coated article to appear yellow to a viewer when viewed at such angles. This yellow coloration (i.e., high b* value) at high viewing angles is problematic in that: (a) it can be aesthetically displeasing to the eye, and/or (b) it can prevent a HT coated article such as the one described above from colorwise matching a non-HT counterpart having fairly neutral off-axis coloration.

The undesirable glass side reflective b* color shift of the aforesaid coating is illustrated as the "conventional" coating in FIG. 3 (i.e., the line with the boxes). FIG. 3 clearly illustrates the undesirable high b* color values realized by the aforesaid conventional coating at viewing angles of 45 and 60 degrees.

Accordingly, it will be appreciated by those skilled in the art that there exists a need in the art for a coating which realizes a more neutral (i.e., closer to zero) b* value at high viewing angles, and which is still capable of achieving low SHGC and/or TS % values.

BRIEF SUMMARY OF THE INVENTION

An object of this invention is to provide a coated article that realizes a rather neutral glass side reflective a* and/or b* value(s) at high viewing angles of 45 and/or 60 degrees. The coated article may be heat treated (HT) (e.g., thermally tempered) in certain embodiments. In certain example embodiments of this invention, coated articles herein have glass side reflective a* and/or b* value(s) no greater than 1.2 (absolute value) (more preferably no greater than 1.0, and most preferably no greater than 0.8) at a viewing angle of about 60 degrees off-axis (i.e., 60 degrees from normal). Such neutral coloration at high viewing angle(s) is advantageous in that it tends to be aesthetically pleasing and may also enable HT coated articles to approximately colorwise match non-HT neutral colored counterparts in a more efficient and desirable manner.

Another object of this invention is to provide a coated article (e.g., monolithic or IG unit) having a SHGC (surface #2 of an IG unit) of no greater than 0.45 (more preferably no greater than 0.41, and most preferably no greater than 0.40), and/or a TS % of no greater than 40% (more preferably no greater than 37%, and most preferably no greater than 34%).

Another object of this invention is to provide a coated article having glass side reflective a* and/or b* color value(s) that is/are more neutral (i.e., is closer to 0) at a 45 and/or 60 degree viewing angle, than at about a 0 degree viewing angle.

Surprisingly, it has been found that one or more of the aforesaid objects is achievable by thinning the titanium oxide layer located below the bottom silver layer in the aforesaid conventional coating. This thinning of the titanium oxide layer surprisingly results in a b* color value that moves toward neutral, and stays around neutral, at high viewing angles (VA) such as about 60 degrees. Thickening of the upper silver layer is a further option that may help achieve a more neutral color at high viewing angle(s) in this respect.

Another object of this invention is to fulfill one or more of the above-listed objects.

In certain example embodiments of this invention, one or more of the above-listed objects is/are achieved by providing a heat treated (e.g., thermally tempered) coated article including a coating supported by a glass substrate, the coating comprising, from the glass substrate outwardly: a layer comprising titanium oxide; a layer comprising silicon nitride; a first contact layer; a first layer comprising silver provided over and in contact with said first contact layer; a dielectric layer; a second layer comprising silver; another dielectric layer; and wherein the layer comprising titanium oxide has a thickness of from 20 to 60 Å, the coated article has a Total Solar (TS) value of no greater than 40%, and the coated article has glass side reflective a* and b* color values of from −1.0 to +1.0 at a viewing angle of 60 degrees.

In certain other example embodiments of this invention, one or more of the above-listed objects is/are fulfilled by providing a coated article including a coating supported by a glass substrate, the coating comprising, from the glass substrate outwardly: a layer comprising titanium oxide; a dielectric layer; a first contact layer; a first layer comprising silver provided over and in contact with said first contact layer; a dielectric layer; a second layer comprising silver; another dielectric layer; and wherein the coated article has glass side reflective a* and b* values that are closer to 0 at a viewing angle of 60 degrees than at a normal viewing angle of 0 degrees.

In certain other example embodiments of this invention, one or more of the above-listed objects is/are fulfilled by providing a method of making a coated article, the method comprising: sputtering a layer comprising titanium oxide so as to be supported by a glass substrate; sputtering a layer comprising silicon nitride on the glass substrate over the layer comprising titanium oxide; sputtering a first contact layer on the glass substrate over the layer comprising silicon nitride; sputtering a first layer comprising silver on the glass substrate over and in contact with the first contact layer; sputtering a dielectric layer on the substrate over the first layer comprising silver; sputtering a second layer comprising silver on the substrate over the dielectric layer; sputtering another dielectric layer on the substrate over the first and second layers comprising silver; and after said sputtering steps recited above, heat treating the glass substrate with the coating thereon in order to thermally tempering the glass substrate, and wherein after said heat treating the coating article has glass side reflective a* and b* color values that are closer to 0 at a viewing angle of 60 degrees than at a normal viewing angle of 0 degrees.

DETAILED DESCRIPTION OF THE INVENTION

Figure 1:
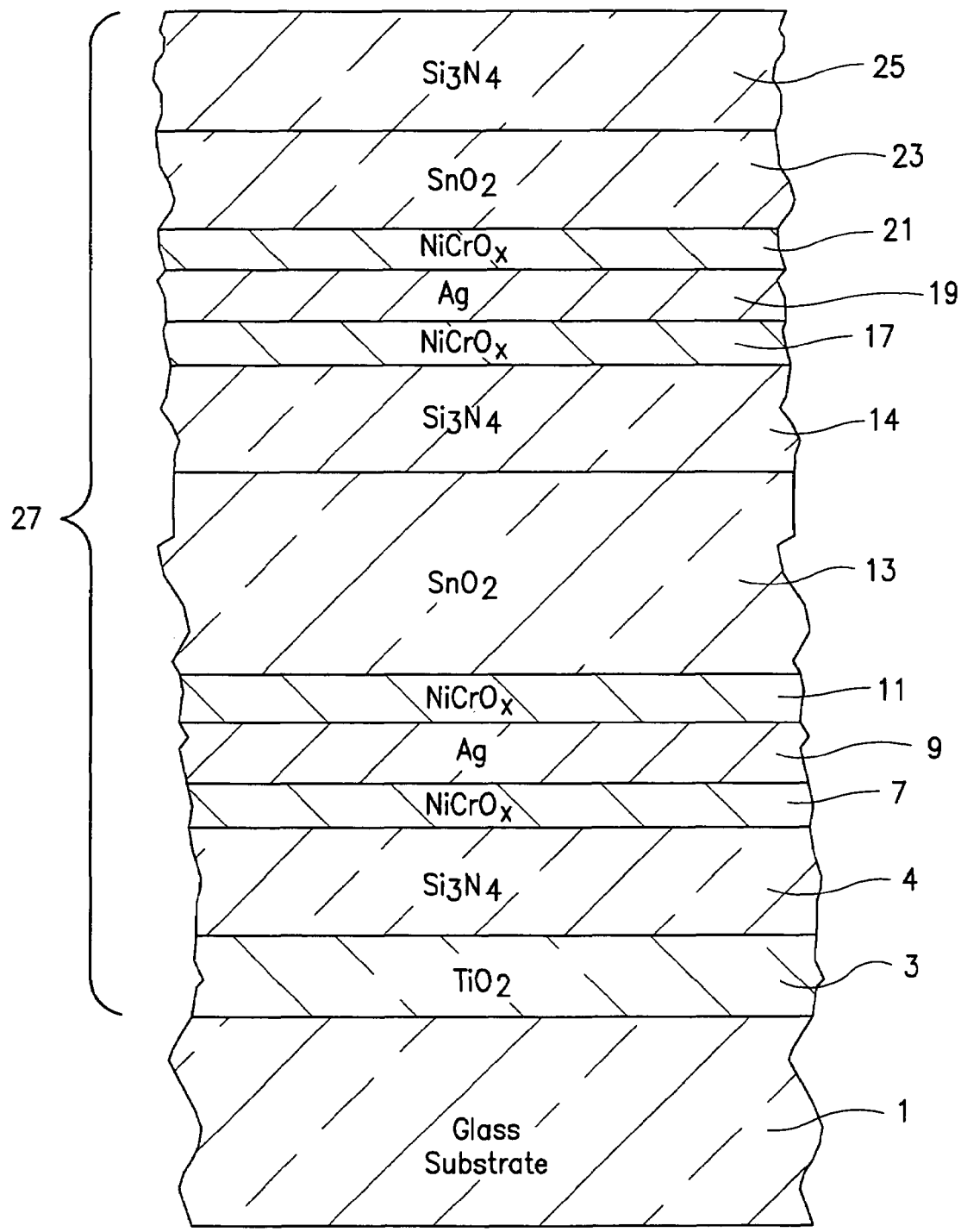
FIG. 1 is a cross sectional view of a heat treated coated article according to an example embodiment of this invention.

Certain example embodiments of this invention relate to a heat treated coated article having fairly neutral coloration at high viewing angles such as at about 45 and/or 60 degrees off-axis. It is noted that off-axis (i.e., at 45 and 60 degree angles) a* and b* values herein are measured monolithically, even though the final coated article may be monolithic or otherwise (e.g., IG window unit).

Surprisingly, it has been found that by thinning the bottom titanium oxide ($TiO_x$, where $1<=x<=3$, or any other suitable stoichiometry) layer compared to the 75 Å thickness described in the conventional coating above, glass side reflective b* color can be significantly improved (i.e., more neutral in this case) at high viewing angles. In certain example embodiments of this invention, the titanium oxide layer is thinned from the conventional 75 Å thickness referenced above to a thickness of from 20 to 60 Å, more preferably from 30 to 60 Å, and even more preferably from 40 to 50 Å.

In certain example embodiments, such thinning of the titanium oxide layer enables the coated article to have color (a* and/or b*) that is more neutral at a high viewing angle such as 45 and/or 60 degrees off-axis, than at a normal (0 degrees on-axis) viewing angle. This is advantageous in that (a) the color of the coated article is less offensive at high viewing angles (i.e., a more neutral color at angle can be achieved), and/or (b) the off-axis color of the coating is easier to approximately match with other coatings.

In certain example embodiments of this invention, it has also been found that the respective thicknesses of the infrared (IR) reflecting layers (e.g., Ag layers) may also play a part in stabilizing a* and/or b* values upon significant changes in viewing angle. In particular, making the upper IR reflecting layer at least 30 Å thicker (more preferably at least 35 Å thicker, and even more preferably at least 40 Å thicker)

than the lower IR reflecting layer has been found to be helpful in improving color at high viewing angles in some instances.

The use of the thin titanium oxide layer herein to render a* and/or b* color values more neutral at high viewing angles may be used in order to provide a HT coated article which colorwise approximately matches a non-HT counterpart coated article such as that described in U.S. Ser. No. 10,324,145, filed simultaneously herewith on Dec. 20, 2002 which is incorporated herein by reference, both at normal viewing angles and at higher viewing angles such as 45 and 60 degrees off-axis.

Certain embodiments of this invention provide a low-E coating or layer system that may be used in applications such as insulating glass (IG) window units, vehicle windows, skylights, glass doors, and the like. Coated articles (e.g., monolithic or IG units) according to certain embodiments of this invention preferably have visible transmission of at least 65% (e.g., when using clear glass substrates from 1.0 to 10 mm thick). In the example context of IG units, this visible transmission is coupled with at least one of: (a) SHGC no greater than about 0.45, more preferably no greater than about 0.41, and most preferably no greater than about 0.40; (b) a TS % of no greater than 40%, more preferably no greater than 37%, and most preferably no greater than 34%; (c) fairly neutral glass side reflective a* and/or b* value(s) no greater than 1.2 (absolute value), more preferably no greater than 1.0, and most preferably no greater than 0.8, at a viewing angle of about 60 degrees off-axis (i.e., 60 degrees from normal); (d) fairly neutral transmissive color at a normal viewing angle such that transmissive a* is from −6.0 to +5.0 (more preferably from −5 to −0), and transmissive b* is from −2.0 to 4.0 (more preferably from 0 to 3.0); and/or (e) fairly neutral reflective color from the exterior of the IG unit (i.e., $Rg/R_{out}$) at a normal viewing angle such that reflective a* (i.e., $a^*_g$) is from −5.0 to 2.0 (more preferably from −3.0 to 0.5), and reflective b* (i.e., $b^*_g$) is from −7.0 to 1.0 (more preferably from −5.0 to −1.0).

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and coating (or layer system) 27 provided on the substrate 1 either directly or indirectly. The coating (or layer system) 27 includes: titanium oxide layer 3 (e.g., a first dielectric layer), dielectric silicon nitride layer 4 which may be $Si_3N_4$, of the Si-rich type for haze reduction, or of any other suitable stoichiometry in different embodiments of this invention, first lower contact layer 7 (which contacts layer 9), first conductive and preferably metallic infrared (IR) reflecting layer 9, first upper contact layer 11 (which contacts layer 9), dielectric layer 13 (which may be deposited in one or multiple steps in different embodiments of this invention), another silicon nitride layer 14, second lower contact layer 17 (which contacts layer 19), second conductive and preferably metallic IR reflecting layer 19, second upper contact layer 21 (which contacts layer 19), dielectric layer 23, and finally protective dielectric layer 25. The "contact" layers 7, 11, 17 and 21 each contact at least one IR reflecting layer (e.g., Ag layer). The aforesaid layers 3–25 make up low-E (i.e., low emissivity) coating 27 which is provided on glass or plastic substrate 1.

In certain preferred embodiments of this invention, the thickness of titanium oxide layer 3 is controlled so as to enable glass side reflective a* and/or b* values that are fairly neutral (i.e., close to zero) at high viewing angles such as 45 and/or 60 degrees. In this respect, the low glass side reflective a* and/or b* color values described herein are enabled by, inter alia, controlling the thickness of titanium oxide layer 3 so as to be from 20 to 60 Å, more preferably from 30 to 60 Å, and even more preferably from 40 to 50 Å. Surprisingly, this reduced thickness of the titanium oxide layer 3 compared to the coating described above in the Background section enables much more neutral glass side reflective b* values at high viewing angles (e.g., see the FIG. 3 graph comparison).

Infrared (IR) reflecting layers 9 and 19 are preferably metallic and/or conductive, and may be made of or include silver (Ag), gold, or any other suitable IR reflecting material. However, metallic Ag is the material of choice for the IR reflecting layers 9 and 19 in certain example non-limiting embodiments of this invention. These IR reflecting layers help enable coating 27 to have low-E and/or good solar control characteristics. The IR reflecting layer(s) may be slightly oxidized in certain embodiments of this invention.

The contact layers 7, 11, 17 and 21 may be of or include nickel (Ni) oxide, chromium/chrome (Cr) oxide, or a nickel alloy oxide such as nickel chrome oxide ($NiCrO_x$), in certain example embodiments of this invention. The use of, for example, $NiCrO_x$ for/in these layers enables durability to be improved. The $NiCrO_x$ layers may be fully oxidized in certain embodiments of this invention (i.e., fully stoichiometric), or may be at least about 50% oxidized in other embodiments of this invention. While $NiCrO_x$ is a preferred material for the contact layers, those skilled in the art will recognize that other materials may instead be used. Contact layer(s) 7, 11, 17 and/or 21 (e.g., of or including $NiCrO_x$) may or may not be oxidation graded in different embodiments of this invention. Oxidation grading means that the degree of oxidation in the layer(s) changes throughout the thickness of the layer(s) so that for example a contact layer may be graded so as to be less oxidized at the contact interface with the immediately adjacent IR reflecting layer than at a portion of the contact layer(s) further or more/most distant from the immediately adjacent IR reflecting layer.

Silicon nitride dielectric layer 4 is provided so as to improve heat-treatability of the coated articles, e.g., such as thermal tempering or the like.

Dielectric layer 13 acts as a coupling layer between the two halves of the coating 27, and is of or includes tin oxide (e.g., $SnO_2$ or some non-stoichiometric form thereof) in certain embodiments of this invention. However, other dielectric materials may instead be used for layer 13, including but not limited to silicon nitride, titanium dioxide, niobium oxide, silicon oxynitride, zinc oxide, or the like.

Dielectric layers 23 and 25 enable the environmental resistance of the coating 27 to be improved, and are also provided for color purposes. In certain example embodiments, dielectric layer 23 may be of or include tin oxide (e.g., $SnO_2$), although other materials may instead be used. Dielectric overcoat layer 25 may be of or include silicon nitride (e.g., $Si_3N_4$) in certain embodiments of this invention, although other materials may instead be used such as titanium dioxide, silicon oxynitride, tin oxide, zinc oxide, niobium oxide, or the like. Layer 23 may be omitted in certain example embodiments of this invention.

Other layer(s) below or above the illustrated coating 27 may also be provided. Thus, while the layer system or coating 27 is "on" or "supported by" substrate 1 (directly or indirectly), other layer(s) may be provided therebetween. Thus, for example, coating 27 of FIG. 1 may be considered "on" and "supported by" the substrate 1 even if other layer(s) are provided between layer 3 and substrate 1.

Moreover, certain layers of coating 27 may be removed in certain embodiments, while others may be added in other embodiments of this invention without departing from the overall spirit of certain embodiments of this invention.

Figure 2:
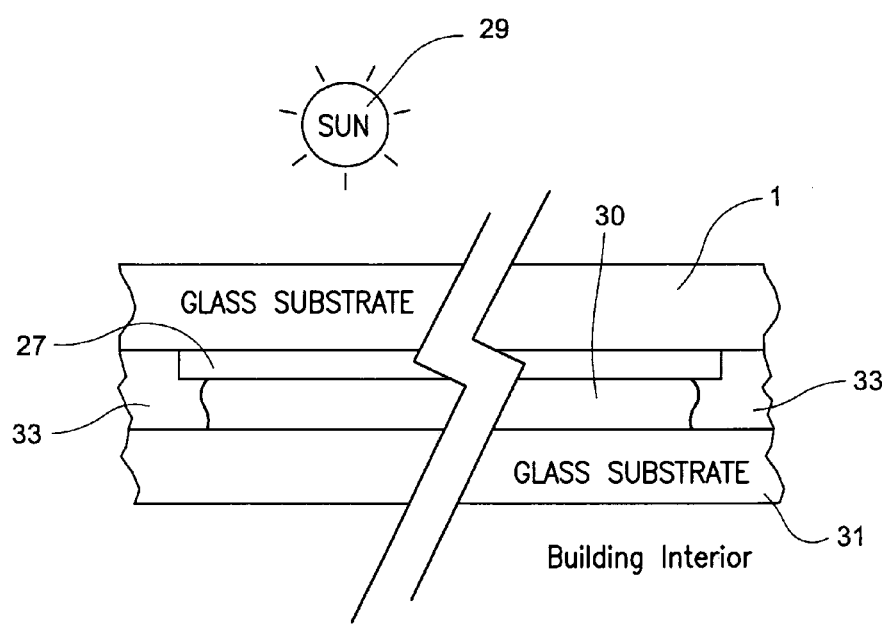
FIG. 2 is a cross sectional view of the coated article of FIG. 1 being used in an IG window unit according to an example embodiment of this invention.

FIG. 2 illustrates the coating or layer system 27 being utilized on surface #2 of an IG window unit. Coatings 27 according to any embodiment herein may be used in IG units as shown in FIG. 2. In order to differentiate the "inside" of the IG unit from its "outside", the sun 29 is schematically presented on the outside. The IG unit includes outside glass pane or sheet (i.e., substrate 1 from FIG. 1) and inside glass pane or sheet 31. These two glass substrates (e.g. float glass 1–10 mm thick) are sealed at their peripheral edges by a conventional sealant and/or spacer 33 and may be provided with a conventional desiccant strip (not shown). The panes may then be retained in a conventional window or door retaining frame. By sealing the peripheral edges of the glass sheets and replacing the air in insulating space (or chamber) 30 with a gas such as argon, a typical, high insulating value IG unit is formed. Optionally, insulating space 30 may be at a pressure less than atmospheric pressure in certain alternative embodiments (with or without a gas in space 30), although this of course is not necessary in all embodiments. While the inner side of substrate 1 is provided with coating 27 in FIG. 2, this invention is not so limiting (e.g., coating 27 may instead be provided on the interior surface of substrate 31 in other embodiments of this invention).

Turning back to FIG. 1, while various thicknesses may be used consistent with one or more of the objects discussed herein, exemplary thicknesses and example materials for the respective layers on the glass substrate 1 in the FIGS. 1–2 embodiment are as follows, from the glass substrate outwardly:

TABLE 2

(Example Materials/Thicknesses; FIG. 1 Embodiment)

| Layer | Preferred Range (Å) | More Preferred (Å) | Example (Å) |
|---|---|---|---|
| $TiO_2$ (layer 3) | 20–60 Å | 30–60 Å | 45 Å |
| $SiN_x$ (layer 4) | 50–250 Å | 140–200 Å | 165 Å |
| $NiCrO_x$ (layer 7) | 10–50 Å | 15–35 Å | 26 Å |
| Ag (layer 9) | 50–250 Å | 80–120 Å | 98 Å |
| $NiCrO_x$ (layer 11) | 10–50 Å | 15–35 Å | 26 Å |
| $SnO_2$ (layer 13) | 0–1,000 Å | 400–800 Å | 525 Å |
| $SiN_x$ (layer 14) | 50–250 Å | 100–200 Å | 165 Å |
| $NiCrO_x$ (layer 17) | 10–50 Å | 15–35 Å | 26 Å |
| Ag (layer 19) | 50–250 Å | 80–220 Å | 141 Å |
| $NiCrO_x$ (layer 21) | 10–50 Å | 15–35 Å | 26 Å |
| $SnO_2$ (layer 23) | 0–500 Å | 70–200 Å | 100 Å |
| $Si_3N_4$ (layer 25) | 0–500 Å | 120–320 Å | 224 Å |

In certain exemplary embodiments of this invention, coating/layer systems 27 according to all embodiments above have the following low-E (low emissivity) characteristics set forth in Table 3 when provided in the context of an insulating glass (IG) window unit (see FIG. 2), and such coated articles may be heat treated (e.g., thermally tempered) in certain embodiments of this invention.

TABLE 3

Low-E Characteristics (post-HT)

| Characteristic | General | More Preferred | Most Preferred |
|---|---|---|---|
| $R_s$ (ohms/sq.): | <=5.0 | <=3.5 | <=2.8 |
| $E_n$: | <=0.07 | <=0.04 | <=0.03 |

Moreover, coated articles including coatings 27 according to certain exemplary embodiments of this invention have the following solar characteristics (e.g., when the coating(s) is provided on a clear soda lime silica glass substrate 1 from 1 to 10 mm thick) in monolithic form (HT or non-HT). In Table 4 below, $R_gY$ is visible reflection from the glass (g) side of the monolithic article, while $R_fY$ is visible reflection from the side of the monolithic article on which coating/film (f) (i.e., coating 27) is located.

TABLE 4

Monolithic Solar Characteristics

| Characteristic | General | More Preferred |
|---|---|---|
| $T_{vis}$ (or TY)(Ill. C, 2 deg.): | >=55% | >=60% |
| $a^*_t$ (Ill. C, 2°): | -6.0 to 0.0 | -5.0 to -1.5 |
| $b^*_t$ (Ill. C, 2°): | -4.0 to 4.0 | 1.0 to 3.0 |
| $R_gY$ (Ill. C, 2 deg.): | 1 to 10% | 3 to 7% |
| $a^*_g$ (Ill. C, 2°): | -2.0 to 4.0 | -0.5 to 2.5 |
| $b^*_g$ (Ill. C, 2°): | -7.0 to 1.0 | -6.0 to 0.0 |
| $a^*_g$ (60° VA): | -1.2 to 1.2 | -1.0 to 1.0 |
| $b^*_g$ (60° VA): | -1.2 to 1.2 | -1.0 to 1.0 |
| $\Delta a^*_g$ (0 to 60° VA): | <=2.5 | <=1.5 |
| $\Delta b^*_g$ (0 to 60° VA): | <=6 | <=5 |
| $R_fY$ (Ill. C, 2 deg.): | 1 to 7% | 1 to 6% |
| $a^*_f$ (Ill. C, 2°): | -5.0 to 5.0 | -4.0 to 3.0 |
| $b^*_f$ (Ill. C, 2°): | -9.0 to 10.0 | -7.0 to 8.0 |
| $T_{ultraviolet}$: | <=40% | <=35% |
| Sheet Resistance ($R_s$): | <=7 ohms/sq. | <=4 ohms/sq. |

Meanwhile, IG window units utilizing coatings 27 according to certain embodiments of this invention as shown in FIG. 2, may have the following solar characteristics (e.g., where the coated glass substrate 1 is a clear soda lime silica glass substrate from 2 to 7 mm thick, and the other soda lime silica glass substrate 31 is clear and from 2 to 7 mm thick). In Table 5 below, $R_gY$ is visible reflection from the outside or exterior of the window (i.e., from where the sun is located in FIG. 2), and $R_fY$ is visible reflection from the interior side (e.g., from within the building interior), and the $a^*$, $b^*$ values under these respective reflection parameters also correspond to glass (g) side (i.e., from outside the window in FIG. 2) and film (f) side (i.e., from interior the window in FIG. 2). It is noted that the characteristics in Table 5 below are measured in the context of an IG unit, except that the $\Delta a^*/b^*$ values and the 60 degree viewing angle $a^*$, $b^*$ values are measured monolithically, before the monolithic article is assembled in the IG unit.

TABLE 5

IG Unit Solar Characteristics (HT)

| Characteristic | General | More Preferred |
|---|---|---|
| $T_{vis}$ (or TY)(Ill. C, 2 deg.): | >=65% | >=67% |
| $a^*_t$ (Ill. C, 2°): | -7.0 to 0.0 | -6 to -1.5 |
| $b^*_t$ (Ill. C, 2°): | -2.0 to 4.0 | 1.0 to 3.0 |
| $R_gY$ (Ill. C, 2 deg.): | 7 to 13% | 9 to 11% |
| $a^*_g$ (Ill. C, 2°): | -3.0 to 2.0 | -2.0 to 0.5 |
| $b^*_g$ (Ill. C, 2°): | -5.0 to 1.0 | -4.0 to -1.0 |
| $a^*_g$ (60° VA): | -1.2 to 1.2 | -1.0 to 1.0 |
| $b^*_g$ (60° VA): | -1.2 to 1.2 | -1.0 to 1.0 |
| $\Delta a^*_g$ (0 to 60° VA): | <=2.5 | <=1.5 |
| $\Delta b^*_g$ (0 to 60° VA): | <=6 | <=5 |
| $R_fY$ (Ill. C, 2 deg.): | 7 to 14% | 10 to 12% |
| $a^*_f$ (Ill. C, 2°): | -4.0 to 2.0 | -2.5 to 0.5 |
| $b^*_f$ (Ill. C, 2°): | -5.0 to 5.0 | -4.0 to 3.0 |
| SHGC (surface #2): | <=0.45 | <=0.40 |
| SC (#2): | <=0.49 | <=0.45 |
| TS %: | <=40% | <=37% |
| $T_{ultraviolet}$: | <=40% | <=35% |

Moreover, it is noted that a diamond-like carbon (DLC) inclusive layer may be provided over coating 27 in certain example embodiments of this invention.

EXAMPLE

The following example is provided for purposes of example only, and is not intended to be limiting. Example processing techniques used for sputtering the Example coating may be found in related U.S. Ser. No. 09/794,224. The following Example was made via sputtering so as to have approximately the layer stack set forth below, from the glass substrate outwardly. The listed thicknesses are approximations:

TABLE 6

LAYER STACK FOR EXAMPLE 1

| Layer | Thickness |
|---|---|
| Glass Substrate | 6 mm |
| TiO$_2$ | 45 Å |
| SiN$_x$ | 165 Å |
| NiCrO$_x$ | 26 Å |
| Ag | 98 Å |
| NiCrO$_x$ | 26 Å |
| SnO$_2$ | 533 Å |
| SiN$_x$ | 165 Å |
| NiCrO$_x$ | 26 Å |
| Ag | 141 Å |
| NiCrO$_x$ | 26 Å |
| SnO$_2$ | 100 Å |
| Si$_3$N$_4$ | 224 Å |

It can be seen that the coating set forth above for this Example includes a titanium oxide layer significantly thinner than that of the comparative coating discussed in the Background. It is believed that this thinner titanium oxide layer is a significant factor in achieving the fairly neutral a* and/or b* values at high viewing angles such as at 60 degrees off-axis. It is also believed that making the upper Ag layer significantly thicker (e.g., at least 30 Å thicker, more preferably at least 35 Å thicker, and most preferably at least 40 Å thicker) than the lower Ag layer helps provide neutral coloration at high viewing angles. The coating was formed on the glass substrate so as to have a visible transmission of 61.78%, and thereafter was heat treated for thermal tempering. Following the heat treatment (HT), the coated article was analyzed monolithically, the results being set forth in Table 7 below.

TABLE 7

Optical Characteristics of Example 1 (Monolithic - HT)

|  | Example 1 |
|---|---|
| Visible Transmission (TY)(Ill. C 2 deg.): | 75.02% |
| a* | −3.96 |
| b* | 1.65 |
| Glass Side Reflective (RY)(Ill C, 2 deg.): | 5.46% |
| a* | 1.57 |
| b* | −5.32 |
| Film Side Reflective (FY)(Ill. C, 2 deg.): | 4.58 |
| a* | −3.17 |
| b* | 6.72 |
| Sheet Resistance (R$_s$)(ohms/square): | 2.39 |

The Example coated article, HT and monolithic, was also analyzed at different viewing angles using a Perkin Elmer Lambda 900 in order to determine color shift due to viewing angle change. The results are set forth below in Table 8. It is noted that in Table 8, as everywhere herein, the 0 degree viewing angle may be truly 0 or alternatively may be approximately 0 such as 2 deg. observer.

TABLE 8

Color at High Viewing Angles of Example 1 (Monolithic)

| Color Characteristic Glass Side Reflective Color | 0 deg. VA | 45 deg. VA | 60 deg. VA |
|---|---|---|---|
| a* | 1.57 | 1.44 | 0.42 |
| b* | −5.32 | −0.57 | −0.55 |
| Δa*$_g$ | n/a | 0.13 | 1.15 |
| Δb*$_g$ | n/a | 4.75 | 4.77 |

It can be seen from Table 8 that the coated article, in monolithic form, exhibited neutral coloration (a* and b*) at the 60 degree viewing angle. This is advantageous for the reasons discussed above, and is believed to be a result of the precise control over the thickness of the titanium oxide layer described above. This neutral coloration at high viewing angles is a significant improvement over the conventional coating described in the Background section above. After such Example HT coated articles are made, they may be used in the context of IG window units.

Figure 3:
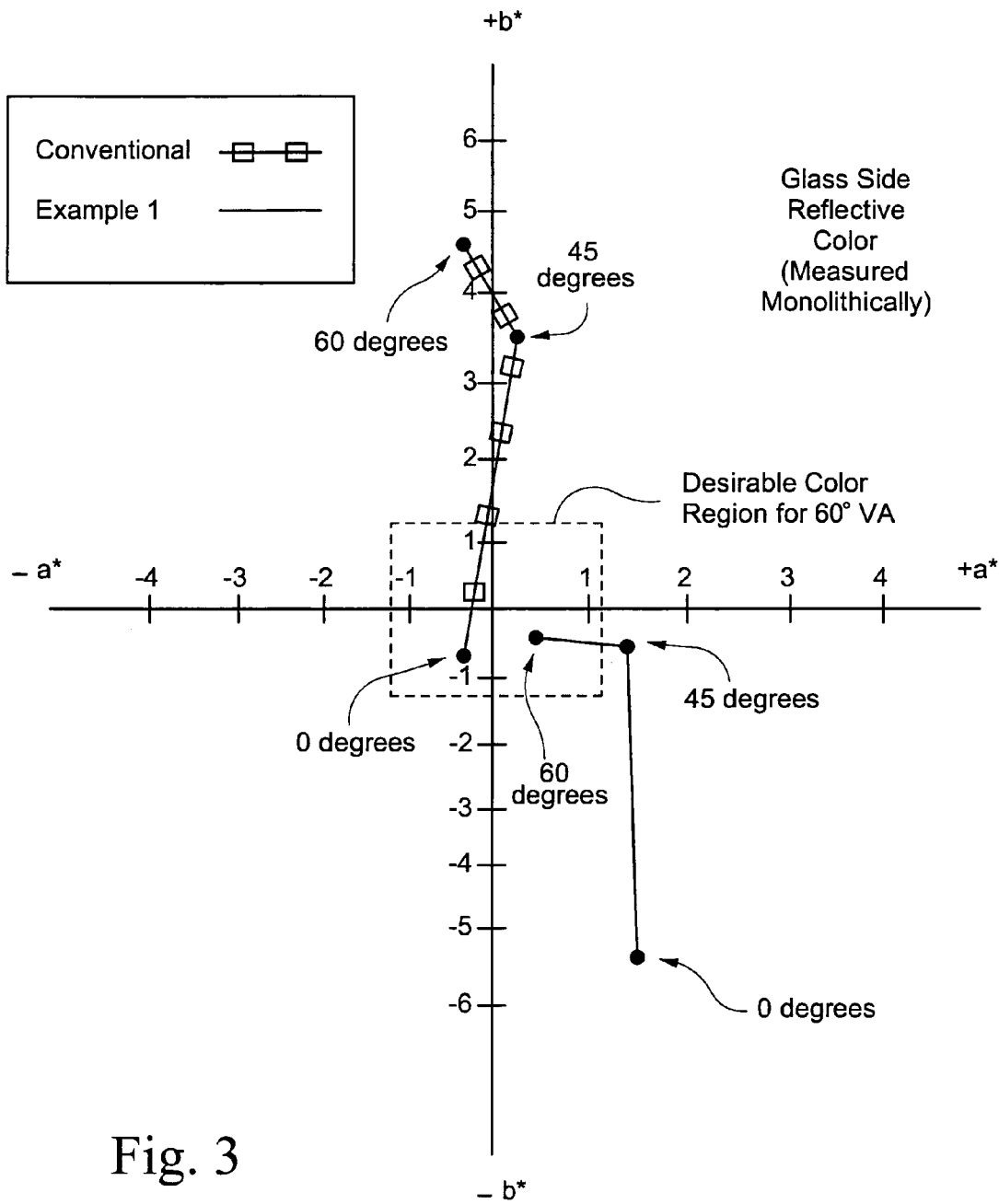
FIG. 3 is an a* versus b* graph illustrating glass side color values upon significant viewing angle shifts for the conventional coating described above compared to Example 1 of this invention which is set forth below.

FIG. 3 is a graph plotting the a*, b* color values of Example 1 above, compared to the conventional coated article described in the Background over a range of viewing angles. It can be seen from FIG. 3 that the conventional coated article (with thicker titanium oxide layer) experiences a much more yellow (i.e., non-neutral) b* value at high viewing angles of 45 and 60 degrees, than does Example 1. This more neutral coloration of Example 1 at such viewing angles is advantageous in (1) approximately matching HT counterpart coatings, and/or (2) reducing strong coloration at high viewing angle(s).

Based on the Example above, a modeled IG unit may have the following characteristics set forth in Table 9 below:

TABLE 9

IG Unit Modeled From Example (HT)

|  | Example 1 |
|---|---|
| Visible Transmission (TY)(Ill. C 2 deg.): | 67.24% |
| a* | −5.2 |
| b* | 1.79 |
| Glass Side Reflective (RY)(Ill C, 2 deg.): | 9.2% |
| a* | −0.61 |
| b* | −3.29 |
| Film Side Reflective (FY)(Ill. C, 2 deg.): | 11.06 |
| a* | −2.16 |
| b* | 2.07 |

Terms used herein are known in the art. For example, intensity of reflected visible wavelength light, i.e. "reflectance" is defined by its percentage and is reported as R$_x$Y or R$_x$ (i.e. the Y value cited below in ASTM E-308-85), wherein "X" is either "G" for glass side or "F" for film side. Herein, RY means glass side reflective reflectance and FY means film side reflectance. "Glass side" (e.g. "G") means, as viewed from the side of the glass substrate opposite that on which the coating resides, while "film side" (i.e. "F") means, as viewed from the side of the glass substrate on which the coating resides. Transmittance herein means solar transmittance, which is made up of visible light transmittance (TY), IR transmittance, and UV transmittance (T$_{UV}$).

Total solar energy transmittance (TS) can be characterized as a weighted average of these transmittance values as is known in the art.

Color characteristics are measured and reported herein using the CIE LAB a*, b* coordinates and scale (i.e. the CIE a*b* diagram, Ill. CIE-C, 2 degree observer). Other similar coordinates may be equivalently used such as by the subscript "h" to signify the conventional use of the Hunter Lab Scale, or Ill. CIE-C, 10° observer, or the CIE LUV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by 10 Using the CIE System" and/or as reported in IES LIGHTING HANDBOOK 1981 Reference Volume.

The term "shading coefficient" (SC) is a term well understood in the art and is used herein according to its well known meaning. It is determined according to ASHRAE Standard 142 "Standard Method for Determining and Expressing the Heat Transfer and Total Optical Properties of Fenestration Products" by ASHRAE Standards Project Committee, SPC 142, September 1995. SC may be obtained by dividing solar heat gain coefficient (SHGC) by about 0.87. Thus, the following formula may be used: SC=SHGC/0.87.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A heat treated coated article including a coating supported by a glass substrate, the coating comprising, from the glass substrate outwardly:
   a layer comprising titanium oxide;
   a layer comprising silicon nitride;
   a first contact layer;
   a first layer comprising silver provided over and in contact with said first contact layer;
   a dielectric layer;
   a second layer comprising silver;
   another dielectric layer; and
   wherein the layer comprising titanium oxide has a thickness of from 20 to 60 Å, the coated article has a Total Solar (TS) value of no greater than 40%, and the coated article has glass side reflective a* and b* color values of from −1.0 to +1.0 at a viewing angle of 60 degrees.

2. The coated article of claim 1, wherein the coated article has glass side reflective a* and b* color values of from −0.8 to +0.8 at the viewing angle of 60 degrees, and a $\Delta a^*_g$ (glass side reflective) value of no greater than 2.5 over a viewing angle shift of about 60 degrees.

3. The coated article of claim 2, wherein the coated article has a $\Delta a^*_g$ (glass side reflective) value of no greater than 1.5 over the viewing angle shift of about 60 degrees.

4. The coated article of claim 1, wherein the titanium oxide layer has a thickness of from 30 to 60 Å, and is sandwiched between and contacts each of the glass substrate and the layer comprising silicon nitride.

5. The coated article of claim 1, wherein the coated article has a TS of no greater than 37%.

6. The coated article of claim 1, wherein the second layer comprising silver is at least 30 Å thicker than the first layer comprising silver.

7. The coated article of claim 1, wherein the second layer comprising silver is at least 40 Å thicker than the first layer comprising silver.

8. The coated article of claim 1, wherein the coated article is thermally tempered, and has a sheet resistance of no greater than 4 ohms/square.

9. The coated article of claim 1, wherein the coated article comprises an IG window unit.

10. The coated article of claim 1, wherein the coated article has glass side reflective a* and b* values that are both closer to zero at a 60 degree viewing angle that at a normal or 0 degree viewing angle.

11. The coated article of claim 1, wherein the coated article has a SHGC of no greater than 0.45.

12. The coated article of claim 1, wherein the coated article has a SHGC of no greater than 0.41.

13. A coated article including a coating supported by a glass substrate, the coating comprising, from the glass substrate outwardly:
   a layer comprising titanium oxide;
   a dielectric layer;
   a first contact layer;
   a first layer comprising silver provided over and in contact with said first contact layer;
   a dielectric layer;
   a second layer comprising silver;
   another dielectric layer;
   wherein the coated article has glass side reflective a* and b* values that are closer to 0 at a viewing angle of 60 degrees than at a normal viewing angle of 0 degrees; and
   wherein the layer comprising titanium oxide has a thickness of from 20 to 60 Å.

14. A coated article including a coating supported by a glass substrate, the coating comprising, from the glass substrate outwardly:
   a layer comprising titanium oxide;
   a dielectric layer;
   a first contact layer;
   a first layer comprising silver provided over and in contact with said first contact layer;
   a dielectric layer;
   a second layer comprising silver;
   another dielectric layer;
   wherein the coated article has glass side reflective a* and b* values that are closer to 0 at a viewing angle of 60 degree than a normal viewing angle of 0 degrees; and
   wherein the coated article has a Total Solar (TS) value of no greater than 40%.

15. A coated article including a coating supported by a glass substrate, the coating comprising, from the glass substrate outwardly:
   a layer comprising titanium oxide;
   a first contact layer;
   a first layer comprising silver provided over and in contact with said first contact layer;
   a dielectric layer;
   a second layer comprising silver;
   another dielectric layer;
   wherein the article has reflective a* and b* values that are closer to 0 at a viewing angle of 60 degree than a normal viewing angle of 0 degrees; and
   wherein the layer comprising titanium oxide has a thickness of from 20 to 60 Å.

16. A coated article including a supported by a glass substrate, the coating comprising, from the glass substrate outwardly:
   a layer comprising titanium oxide;
   a first contact layer;
   a first comprising silver provided over and in contact with said first contact layer;
   a dielectric layer;
   a second layer comprising silver;
   another dielectric layer;
   wherein the coated article has glass side reflective a* and b* values that are closer to 0 at a viewing angle of 60 degrees than at a normal viewing angle of 0 degree; and
   wherein the coated article has a Total solar (TS) value of no greater than 40%.

* * * * *